US011948507B2

(12) United States Patent
Yin et al.

(10) Patent No.: US 11,948,507 B2
(45) Date of Patent: Apr. 2, 2024

(54) PIXEL CIRCUITRY, METHOD FOR DRIVING PIXEL CIRCUITRY, AND DISPLAY DEVICE

(71) Applicant: BOE Technology Group Co., Ltd., Beijing (CN)

(72) Inventors: Xinshe Yin, Beijing (CN); Tian Dong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 224 days.

(21) Appl. No.: 17/424,854

(22) PCT Filed: Jan. 26, 2021

(86) PCT No.: PCT/CN2021/073736

§ 371 (c)(1),
(2) Date: Jul. 21, 2021

(87) PCT Pub. No.: WO2021/169706

PCT Pub. Date: Sep. 2, 2021

(65) Prior Publication Data

US 2023/0154400 A1 May 18, 2023

(30) Foreign Application Priority Data

Feb. 26, 2020 (CN) ........................ 202010119918.3

(51) Int. Cl.
*G09G 3/3233* (2016.01)

(52) U.S. Cl.
CPC ... *G09G 3/3233* (2013.01); *G09G 2300/0842* (2013.01); *G09G 2310/061* (2013.01); *G09G 2320/0233* (2013.01)

(58) Field of Classification Search
CPC ......... G09G 3/3233; G09G 2300/0842; G09G 2310/061; G09G 2320/0233;
(Continued)

(56) References Cited

U.S. PATENT DOCUMENTS 10,102,803 B2 10/2018 Park et al.
2004/0056605 A1* 3/2004 Yoshida .............. G09G 3/3233 315/169.3
(Continued)

FOREIGN PATENT DOCUMENTS

CN 103426933 A 12/2013
CN 108470544 A 8/2018
(Continued)

*Primary Examiner* — Jeff Piziali
(74) *Attorney, Agent, or Firm* — IPro, PLLC

(57) ABSTRACT

A pixel circuitry, a method for driving the pixel circuitry, and a display device are provided. The pixel circuitry includes a driving circuit, a first switching circuit, a second switching circuit and a light-emitting element. The driving circuit includes a first transistor and a storage capacitor. A control end of the first transistor is electrically connected to the first switching circuit, a first end of the first transistor is electrically connected to a first voltage end, a second end of the first transistor is electrically connected to an anode of the light-emitting element, a third end of the first transistor is electrically connected to the second switching circuit, a first end of the storage capacitor is electrically connected to the first voltage end, and a second end of the storage capacitor is electrically connected to the control end of the first transistor.

19 Claims, 6 Drawing Sheets

(58) Field of Classification Search
CPC ... G09G 2300/0426; G09G 2310/0251; G09G 2310/0262; G09G 3/3208; G09G 3/3266
See application file for complete search history.

(56) References Cited

U.S. PATENT DOCUMENTS

| | | | | |
|---|---|---|---|---|
| 2007/0275518 | A1 | 11/2007 | Wang | |
| 2013/0306969 | A1* | 11/2013 | Park | G09G 3/3208 257/E29.292 |
| 2014/0062331 | A1 | 3/2014 | Nam et al. | |
| 2015/0179105 | A1* | 6/2015 | Mizukoshi | G09G 3/3266 345/76 |
| 2018/0082637 | A1* | 3/2018 | Zhang | G09G 3/3258 |
| 2020/0202797 | A1* | 6/2020 | Cho | G09F 9/301 |
| 2021/0020105 | A1 | 1/2021 | Yin | |
| 2021/0201761 | A1 | 7/2021 | Yin | |
| 2021/0335234 | A1 | 10/2021 | Yin | |

FOREIGN PATENT DOCUMENTS

| | | | | | |
|---|---|---|---|---|---|
| CN | 109377944 | A | * | 2/2019 | G09G 3/3233 |
| CN | 110062943 | A | | 7/2019 | |
| CN | 110062944 | A | | 7/2019 | |
| CN | 110428776 | A | | 11/2019 | |
| CN | 110520922 | A | | 11/2019 | |
| CN | 111210771 | A | | 5/2020 | |
| EP | 3340223 | A1 | | 6/2018 | |
| KR | 20060060843 | A | | 6/2006 | |

* cited by examiner

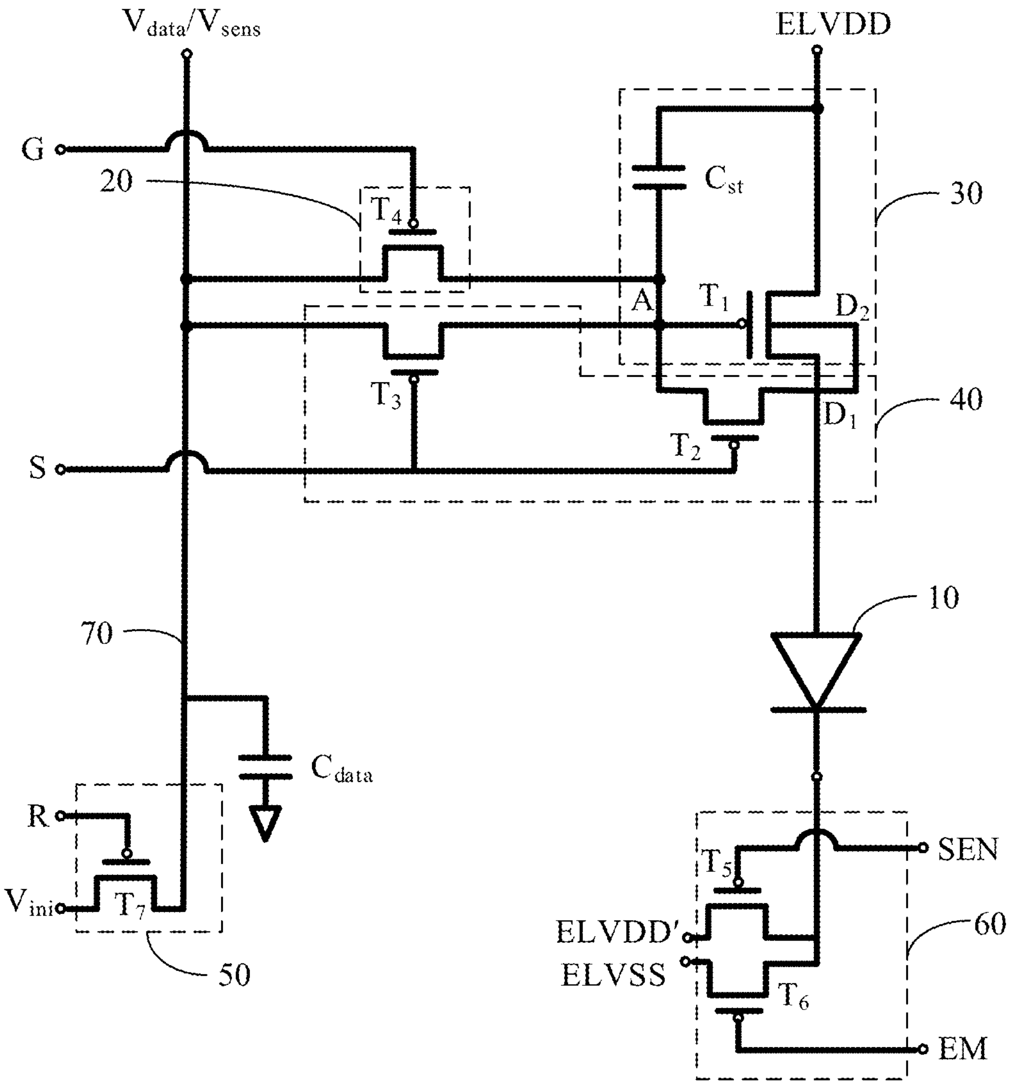

Fig.5 at a sensing scanning stage, maintaining a potential at the data sensing line to be a sensing voltage for cutting off the secondary driving transistor of the first transistor to acquire a threshold voltage of the secondary driving transistor, and calculating a threshold voltage of the primary driving transistor in accordance with the threshold voltage of the secondary driving transistor — 601 at a data scanning stage, applying a compensated data voltage to the data sensing line to drive the light-emitting element to emit light, wherein the compensated data voltage is determined in accordance with the threshold voltage of the primary driving transistor — 602

Fig.6

PIXEL CIRCUITRY, METHOD FOR DRIVING PIXEL CIRCUITRY, AND DISPLAY DEVICE

CROSS-REFERENCE TO RELATED APPLICATION

This application is the U.S. national phase of PCT Application No. PCT/CN2021/073736 filed on Jan. 26, 2021, which claims a priority of the Chinese patent application No. 202010119918.3 filed in China on Feb. 26, 2020, which are incorporated herein by reference in their entireties.

TECHNICAL FIELD

The present disclosure relates to the field of display technology, in particular to a pixel circuitry, a method for driving a pixel circuitry, and a display device.

BACKGROUND

In an Organic Light-Emitting Diode (OLED) display panel, as a basic operating principle for driving an OLED, a Thin Film Transistor (TFT) is used as a driving transistor to control a current, so as to drive the OLED to emit light. Typically, a pixel circuitry is configured in such a manner that the driving transistor is connected in series to the OLED and then connected to a driving voltage source ELVDD of the OELD, and a gate electrode of the driving transistor is connected to a data sensing line representing grayscale voltage data via a switch transistor. The pixel circuitry is a simplest mode for controlling the driving current supplied to the OLED. However, the driving current depends on the square of a threshold voltage $V_{th}$ of the driving transistor. As long as $V_{th}$ of the driving transistor between pixels is up to 0.1V or more, a relatively large error occurs for the driving current. At this time, there is a difference between brightness values of the pixels, and an image displayed on the OLED display panel has non-uniform brightness.

In order to solve the above problem, a pixel compensation scheme has been proposed in the related art. In this scheme, at a sensing scanning stage of a non-display period, the data sensing line is charged through the current flowing through the driving transistor, and the threshold voltage $V_{th}$ of the driving transistor is acquired through detecting a sensing voltage $V_{sens}$ on the data sensing line for cutting off the driving transistor, and then a value of $V_{th}$ is added into an original data voltage to form a compensated data signal for driving the OLED to emit light. In this way, it is able to compensate for the threshold voltage of the driving transistor, thereby to prevent the occurrence of non-uniform display brightness due to the difference in the threshold voltage of the driving transistor. However, in actual use, due to a relatively weak charging capability of the driving transistor, within a limited charging time period, it is impossible to charge the data sensing line to be in a saturated state, i.e., the sensing voltage $V_{sens}$ detected at the sensing scanning stage is not in the saturated state, and the detected voltage on the data sensing line does not reach a value capable of cutting off the driving transistor. At this time, a detected value of the sensing voltage $V_{sens}$ is relatively small, and the acquired threshold voltage $V_{th}$ is not accurate.

SUMMARY

An object of the present disclosure is to provide a pixel circuitry, a method for driving the pixel circuitry, and a display device.

In one aspect, the present disclosure provides in some embodiments a pixel circuitry, including a driving circuit, a first switching circuit, a second switching circuit and a light-emitting element,

- wherein the driving circuit is configured to, under the control of a voltage transferred by the first switching circuit, drive the light-emitting element to emit light, and the driving circuit includes a first transistor and a storage capacitor;
- the first transistor is a four-end transistor including a first end, a second end, a third end and a control end; the control end of the first transistor is electrically connected to the first switching circuit, the first end of the first transistor is electrically connected to a first voltage end, the second end of the first transistor is electrically connected to an anode of the light-emitting element, and the third end of the first transistor is electrically connected to the second switching circuit;
- a first end of the storage capacitor is electrically connected to the first voltage end, and a second end of the storage capacitor is electrically connected to the control end of the first transistor;
- the first switching circuit is electrically connected to a data sensing line, and configured to write a voltage on the data sensing line into the storage capacitor in an on state in response to a first scanning signal from a first scanning line;
- the second switching circuit is electrically connected to the data sensing line, and configured to enable the third end of the first transistor to be electrically connected to the data sensing line in the on state in response to a second scanning signal from a second scanning line.

In a possible embodiment of the present disclosure, the control end, the first end and the second end of the first transistor form a primary driving transistor, the control end, the first end and the third end of the first transistor form a secondary driving transistor, and a channel corresponding to the secondary driving transistor is a part of a channel corresponding to the primary driving transistor.

In a possible embodiment of the present disclosure, the first transistor is a dual-drain P-type Thin Film Transistor (TFT), the control end of the first transistor is a gate electrode, the first end of the first transistor is a source electrode, and the second end and the third end of the first transistor are a first drain electrode and a second drain electrode respectively.

In a possible embodiment of the present disclosure, the first transistor is a dual-source N-type TFT, the control end of the first transistor is a gate electrode, the first end of the first transistor is a drain electrode, and the second end and the third end of the first transistor are a first source electrode and a second source electrode respectively.

In a possible embodiment of the present disclosure, a ratio of a length of the channel corresponding to the primary driving transistor to a length of the channel corresponding to the secondary driving transistor is within a range of 2:1 to 30:1.

In a possible embodiment of the present disclosure, the control end of the first transistor is electrically connected to the first switching circuit via a first node, the second switching circuit includes a second transistor and a third transistor, control ends of the second transistor and the third transistor are configured to receive the second scanning signal, a first end of the second transistor is electrically connected to the first node, a second end of the second transistor is electrically connected to the third end of the first transistor, a first end of the third transistor is electrically connected to the data sensing line, and a second end of the third transistor is electrically connected to the first node.

In a possible embodiment of the present disclosure, the first switching circuit includes a fourth transistor, a control end of the fourth transistor is configured to receive the first scanning signal, a first end of the fourth transistor is electrically connected to the data sensing line, and a second end of the fourth transistor is electrically connected to the control end of the first transistor.

In a possible embodiment of the present disclosure, a cathode of the light-emitting element is electrically connected to a control circuit, the control circuit is configured to enable the cathode of the light-emitting element to be electrically connected to a second voltage end or a third voltage end in response to at least one control signal, wherein the light-emitting element is configured to be in a forward-biased mode under the control of a potential at the second voltage end, and the light-emitting element is configured to be in a backward-biased mode under the control of a potential at the third voltage end.

In a possible embodiment of the present disclosure, the light-emitting element is configured to emit light in the forward-biased mode, and the light-emitting element is configured to do not emit light in the backward-biased mode.

In a possible embodiment of the present disclosure, the data sensing line is electrically connected to a resetting circuit, the resetting circuit is configured to reset a potential at the data sensing line to an initialization voltage in response to a resetting signal, and the secondary driving transistor is configured to be turned on under the control of the initialization voltage.

In another aspect, the present disclosure provides in some embodiments a display device, including a plurality of pixel units. Each of the pixel units includes the above-mentioned pixel circuitry.

In yet another aspect, the present disclosure provides in some embodiments a method for driving a pixel circuitry, wherein the pixel circuitry includes a driving circuit, a first switching circuit, a second switching circuit and a light-emitting element, wherein the driving circuit is configured to, under the control of a voltage transferred by the first switching circuit, drive the light-emitting element to emit light, and the driving circuit includes a first transistor and a storage capacitor;

the first transistor is a four-end transistor including a first end, a second end, a third end and a control end; the control end of the first transistor is electrically connected to the first switching circuit, the first end of the first transistor is electrically connected to a first voltage end, the second end of the first transistor is electrically connected to an anode of the light-emitting element, and the third end of the first transistor is electrically connected to the second switching circuit;

a first end of the storage capacitor is electrically connected to the first voltage end, and a second end of the storage capacitor is electrically connected to the control end of the first transistor;

the first switching circuit is electrically connected to a data sensing line, and configured to write a voltage on the data sensing line into the storage capacitor in an on state in response to a first scanning signal from a first scanning line;

the second switching circuit is electrically connected to the data sensing line, and configured to enable the third end of the first transistor to be electrically connected to the data sensing line in the on state in response to a second scanning signal from a second scanning line;

the control end, the first end and the second end of the first transistor form a primary driving transistor, the control end, the first end and the third end of the first transistor form a secondary driving transistor, wherein the method includes:

at a sensing scanning stage, maintaining a potential at the data sensing line to be a sensing voltage for cutting off the secondary driving transistor, to acquire a threshold voltage of the secondary driving transistor, and calculating a threshold voltage of the primary driving transistor in accordance with the threshold voltage of the secondary driving transistor;

at a data scanning stage, applying a compensated data voltage to the data sensing line to drive the light-emitting element to emit light, wherein the compensated data voltage is determined in accordance with the threshold voltage of the primary driving transistor.

In a possible embodiment of the present disclosure, the sensing scanning stage includes a threshold voltage establishment sub-stage, wherein at the threshold voltage establishment sub-stage, the first switching circuit is not turned on in response to the first scanning signal, the second switching circuit is turned on in response to the second scanning signal, the secondary driving transistor charges the storage capacitor and the data sensing line to pull up a voltage on the data sensing line, and when the voltage on the data sensing line has been pulled up to a difference between a voltage of the first voltage end and the threshold voltage of the secondary driving transistor, the secondary driving transistor is cut off.

In a possible embodiment of the present disclosure, the sensing scanning stage further includes a resetting sub-stage before the threshold voltage establishment sub-stage, wherein at the resetting sub-stage, the first switching circuit is not turned on in response to the first scanning signal, the second switching circuit is turned on in response to the second scanning signal to reset the potential at the data sensing line to an initialization voltage for turning on the secondary driving transistor, and the initialization voltage is smaller than the difference between the voltage of the first voltage end and the threshold voltage of the secondary driving transistor.

In a possible embodiment of the present disclosure, the sensing scanning stage further includes a sampling sub-stage subsequent to the threshold voltage establishment sub-stage, wherein at the sampling sub-stage, the sensing voltage is read from the data sensing line to acquire the threshold voltage of the secondary driving transistor, the threshold voltage of the primary driving transistor is calculated in accordance with the threshold voltage of the secondary driving transistor as well as a function relationship between the threshold voltage and a length of a channel, and the threshold voltage of the primary driving transistor is stored in a memory of an external compensation module.

In a possible embodiment of the present disclosure, at the data scanning stage, the second switching circuit is not turned on in response to the second scanning signal, the first switching circuit is turned on in response to the first scanning signal to transmit the compensated data voltage from the data sensing line to the second end of the storage capacitor and the control end of the first transistor, the primary driving transistor is turned on under the control of the compensated data voltage to generate a driving current for driving the light-emitting element to emit light, the compensated data voltage is a sum of an original data voltage and a compensation voltage, and the compensation voltage is determined in accordance with the threshold voltage of the primary driving transistor.

BRIEF DESCRIPTION OF THE DRAWINGS

The other features, purposes and advantages of the present disclosure will become more apparent through reading the description about the nonrestrictive embodiments with reference to the following drawings.

FIG. 5 is a schematic view showing the pixel circuitry according to another embodiment of the present disclosure;

FIG. 6 is a flow chart of a method for driving a pixel circuitry according to an embodiment of the present disclosure;

DETAILED DESCRIPTION

Figure 1:
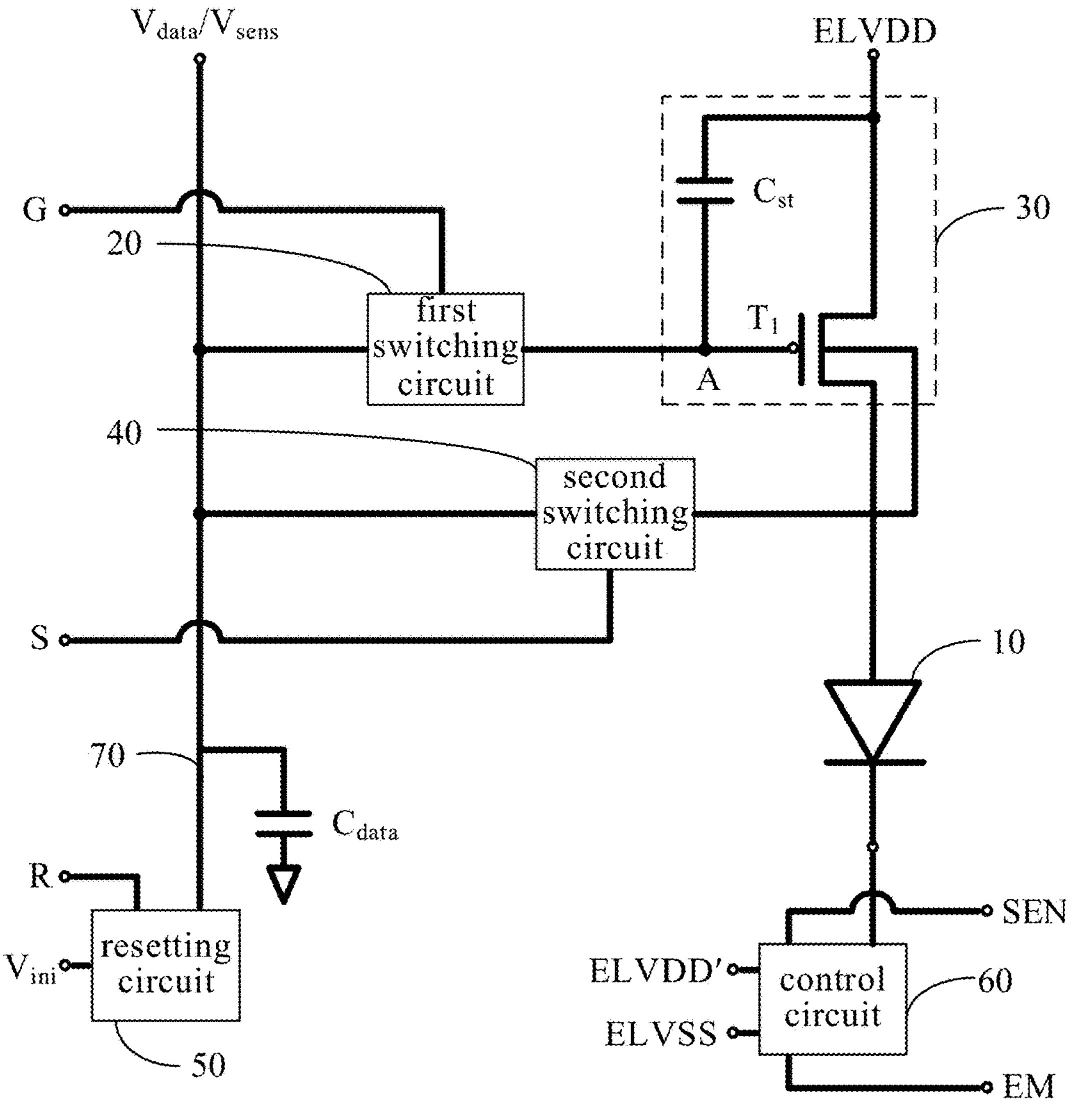
FIG. 1 is a schematic view showing a pixel circuitry according to an embodiment of the present disclosure.

The present disclosure will be described hereinafter in conjunction with the drawings and embodiments. The following embodiments are for illustrative purposes only, but shall not be used to limit the scope of the present disclosure. It should be appreciated that, for ease of description, merely parts related to the present disclosure are shown in the drawings.

Such words as "first" and "second" are merely used to differentiate different components rather than to represent any order, number or importance. Such words as "include" or "including" intends to indicate that an element before the word contains an element after the word, without excluding any other element. Such words as "on" and "under" are merely used to represent relative position relationship, and when an absolute position of the object is changed, the relative position relationship may be changed too.

In the embodiments of the present disclosure, when it is described that a specific element is arranged between a first element and a second element, there is, or there is not, an intermediate element between the specific element and the first or second element. When it is described that a specific element is connected to the other element, it is directly connected to the other element without any intermediate element, or it is indirectly connected to the other element via an intermediate element.

Unless otherwise defined, any term including technical or scientific term used herein shall have the common meaning understood by a person skilled in the art. It should be further appreciated that, any term defined in a commonly-used dictionary shall be understood as having the meaning in conformity with that in the related art, and shall not be interpreted idealistically or extremely, unless clearly defined in that way.

Any techniques, methods and devices known to a person skilled in the art will not be particularly discussed, and in an appropriate case, these techniques, methods and devices shall be considered as a part of the specification.

It should be appreciated that, in the case of no conflict, the embodiments of the present disclosure and the features therein may be combined. The present disclosure will be described hereinafter in conjunction with the drawings and embodiments.

FIG. 1 is a schematic view showing a pixel circuitry according to an embodiment of the present disclosure. As shown in FIG. 1, the pixel circuitry includes a first switching circuit 20, a second switching circuit 40 and a driving circuit 30.

The driving circuit 30 is configured to drive a light-emitting element 10 to emit light under the control of a voltage transferred by the first switching circuit 20. The light-emitting element 10 includes an anode and a cathode, e.g., the light-emitting element 10 is an OLED whose anode is electrically connected to the driving circuit 30.

As shown in FIG. 1, the driving circuit 30 includes a first transistor (driving transistor) $T_1$ and a storage capacitor $C_{st}$.

The first transistor $T_1$ is a four-end transistor. A control end of the first transistor $T_1$ is electrically connected to the first switching circuit 20, a first end of the first transistor $T_1$ is electrically connected to a first voltage end ELVDD, a second end of the first transistor $T_1$ is electrically connected to the anode of the light-emitting element 10, and the third end of the first transistor $T_1$ is electrically connected to the second switching circuit 40. The first transistor $T_1$ may be represented by a primary driving transistor and a secondary driving transistor. The control end, the first end and the second end form the primary driving transistor configured to drive the light-emitting element 10 to emit light. The control end, the first end and the third end form the secondary driving transistor configured to detect a threshold voltage of the first transistor $T_1$ at a sensing scanning stage. A channel corresponding to the secondary driving transistor is a part of a channel corresponding to the primary driving transistor.

To be specific, the first transistor $T_1$ is a dual-drain P-type TFT. The control end of the first transistor $T_1$ is a gate electrode, the first end of the first transistor $T_1$ electrically connected to the first voltage end ELVDD is a source electrode, the second end of the first transistor $T_1$ electrically connected to the anode of the light-emitting element 10 is a first drain electrode, and the third end of the first transistor $T_1$ electrically connected to the second switching circuit 40 is a second drain electrode. The gate electrode, the source electrode and the first drain electrode form the primary driving transistor of the first transistor $T_1$, and the gate electrode, the source electrode and the second drain electrode form the secondary driving transistor of the first transistor $T_1$. The channel corresponding to the secondary driving transistor (i.e., a channel formed by the source electrode and the second drain electrode) is a part of the channel corresponding to the primary driving transistor (i.e., a channel formed by the source electrode and the first drain electrode).

In another possible embodiment of the present disclosure, the first transistor $T_1$ is a dual-source N-type TFT. The control end of the first transistor $T_1$ is a gate electrode, the first end of the first transistor $T_1$ electrically connected to the first voltage end ELVDD is a drain electrode, the second end of the first transistor $T_1$ electrically connected to the anode of the light-emitting element 10 is a first source electrode, and the third end of the first transistor $T_1$ electrically connected to the second switching circuit 40 is a second source electrode. The gate electrode, the drain electrode and the first source electrode form the primary driving transistor of the first transistor $T_1$, and the gate electrode, the drain electrode and the second source electrode form the secondary driving transistor of the first transistor $T_1$. The channel corresponding to the secondary driving transistor (i.e., a channel formed by the drain electrode and the second source electrode) is a part of the channel corresponding to the primary driving transistor (i.e., a channel formed by the drain electrode and the first source electrode).

A first end of the storage capacitor $C_{st}$ is electrically connected to the first voltage end ELVDD, and a second end of the storage capacitor $C_{st}$ is electrically connected to the control end of the first transistor $T_1$. As shown in FIG. 1, the second end of the storage capacitor $C_{st}$ and the control end of the first transistor $T_1$ are electrically connected to the first switching circuit 20 via a first node A.

The first switching circuit 20 is electrically connected between the data sensing line 70 and the driving circuit 30, and configured to write a voltage on the data sensing line 70 into the storage capacitor $C_{st}$ in an on state in response to a first scanning signal G from a first scanning line. The first scanning signal G may be a data scanning signal.

The second switching circuit 40 is electrically connected between the data sensing line 70 and the driving circuit 30, and configured to apply a voltage at the third end of the secondary driving transistor of the first transistor $T_1$ to the data sensing line 70 in the on state in response to a second scanning signal S from a second scanning line, so as to maintain a potential at the data sensing line 70 to be a sensing voltage for cutting off the secondary driving transistor of the first transistor $T_1$. The second scanning signal S is a sensing scanning signal, and the potential at the data sensing line 70 is maintained as a sensing voltage $V_{sens}$ at a sensing scanning stage of a non-display period.

It should be appreciated that, the sensing voltage $V_{sens}$ is a difference between the potential at the first voltage end ELVDD and a threshold voltage $V_{th}'$ of the secondary driving transistor of the first transistor $T_1$. Hence, after the potential at the data sensing line 70 is maintained as the sensing voltage $V_{sens}$, the sensing voltage $V_{sens}$ on the data sensing line 70 is read to acquire the threshold voltage $V_{th}'$ of the secondary driving transistor.

The first transistor $T_1$ in the embodiments of the present disclosure will be described hereinafter.

Figure 2:
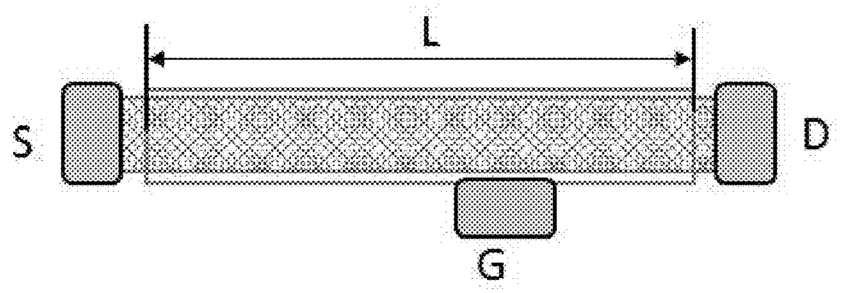
Fig. 2 (Prior Art)
FIG. 2 is a schematic view showing a three-end TFT in related art.

It should be appreciated that, a TFT in related art consists of a semiconductor thin film material made of amorphous silicon (a-Si), Low Temperature Poly-Silicon (LTPS) or oxide semiconductor, a gate electrode, and insulation material between the gate electrode and the semiconductor thin film material. As shown in FIG. 2, the TFT includes a source electrode S, a drain electrode D and a gate electrode G.

When a voltage $V_{gs}$ is applied between the gate electrode G and the source electrode S of the TFT, a current flowing through the TFT is calculated through $$I_D = \frac{1}{2}\mu C_{OX}\frac{W}{L}(V_{gs} - V_{th})^2,$$

where μ represents carrier mobility of the TFT, Cox represents a capacitance of a dielectric layer of the gate electrode of the TFT, W and L represent a width and a length of a channel of the TFT respectively, and $V_{th}$ represents a threshold voltage of the TFT.

Figure 3:
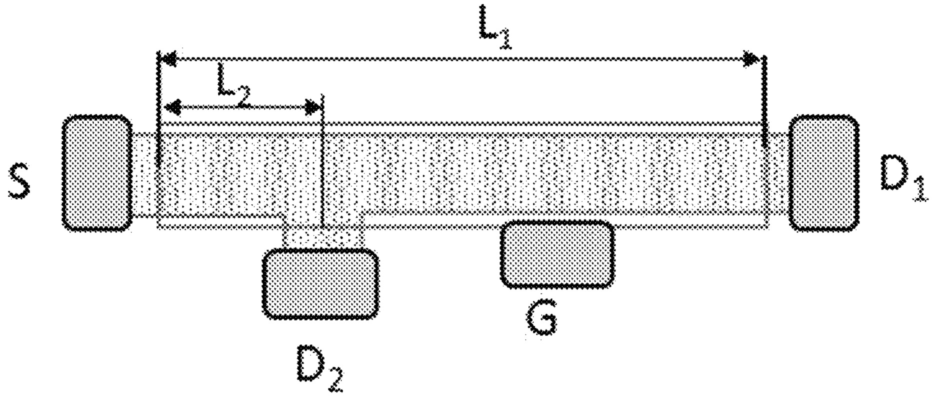
FIG. 3 is a schematic view showing a dual-drain P-type TFT according to an embodiment of the present disclosure.
Figure 4:
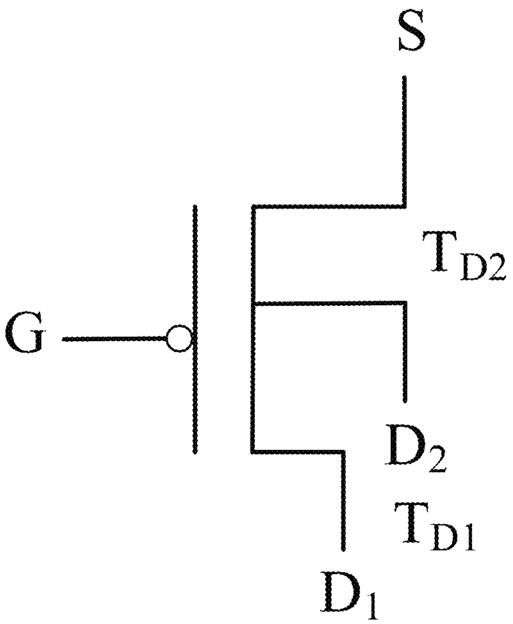
FIG. 4 is a schematic view showing symbols of the dual-drain P-type TFT in FIG. 3.

When the first transistor $T_1$ is the dual-drain P-type TFT in FIG. 3, as compared with the three-end TFT in related art, a new end, i.e., a second drain electrode, is added. Hence, the first transistor $T_1$ is a four-end TFT including the gate electrode G, the source electrode S, a first drain electrode $D_1$ and a second drain electrode $D_2$, and the drain electrodes $D_1$ and $D_2$ are called as double drain electrodes. FIG. 4 shows the symbols of the dual-drain P-type TFT, where the electrodes G, S and $D_1$ form a transistor $T_{D1}$ of the dual-drain transistor with a channel length $L_1$, and the electrodes G, S and $D_2$ form a transistor $TD_2$ of the dual-drain transistor with a channel length $L_2$. The transistor $T_{D1}$ has a same channel width as the transistor $T_{D2}$, and the channel length $L_2$ of the transistor $T_{D2}$ is a part of the channel length $L_1$ of the transistor $T_{D1}$.

When Vgs is applied between the gate electrode and the source electrode of the dual-drain P-type TFT, and the channel corresponding to the electrode $D_2$ is used, a current flowing through the electrode $D_2$ is calculated through $$I_{D2} = \frac{1}{2}\mu C_{OX}\frac{W}{L_2}(V_{gs} - V_{th2})^2,$$

and when the channel corresponding to the electrode $D_1$ is used, a current flowing through the electrode $D_1$ is calculated through $$I_{D1} = \frac{1}{2}\mu C_{OX}\frac{W}{L_1}(V_{gs} - V_{th1})^2,$$

where $V_{th1}$ and $V_{th2}$ represent threshold voltages of the transistor $T_{D1}$ and the transistor $T_{D2}$ respectively. Because the channel length $L_2$ of the transistor $T_{D2}$ is a part of the channel length $L_1$ of the transistor $T_{D1}$, the threshold voltage $V_{th1}$ of the transistor $T_{D1}$ is greater than the threshold voltage $V_{th2}$ of the transistor $T_{D2}$. Hence, a ratio of the current flowing through $D_2$ to the current flowing through $D_1$ is greater than a ratio of the channel length of the transistor $T_{D1}$ to the channel length of the transistor $T_{D2}$, i.e., $L_1/L_2$.

When the dual-drain P-type TFT is applied to the pixel circuitry in the embodiments of the present disclosure, it is able to control the currents flowing through the pixel circuitry at the sensing scanning stage and the data scanning stage through the two channels of the transistor. At the sensing scanning stage, the secondary driving transistor with a small channel length (i.e., the transistor $T_{D2}$) is used, so as to charge the data sensing line 70 through the large driving current provided by the first transistor $T_1$ within a short time period, and at the data scanning stage, the primary driving transistor with a large channel length (i.e., the transistor $T_{D1}$) is used to provide a normal current to drive the OLED to emit light.

The ratio of the channel length of the primary driving transistor to the channel length of the secondary driving transistor is set according to the practical need, and thus will not be particularly defined herein. In a possible embodiment of the present disclosure, the ratio of the channel length of the primary driving transistor to the channel length of the secondary driving transistor is within a range of 2:1 to 30:1. For example, the ratio is 10:1 or 20:1, and at this time, a ratio of the current flowing through the secondary driving transistor to the current flowing through the primary driving transistor needs to be greater than 10 or 20. In other words, as compared with the three-end transistor in related art, for the transistor with two channels, it is able to increase the current for charging the data sensing line 70 at the sensing scanning stage by 10 times or 20 times, so it is able to remarkably reduce a charging time.

The channel corresponding to the secondary driving transistor is a part of the channel corresponding to the primary driving transistor, so in the case of a same material and a same process, the threshold voltage $V_{th}$ of the transistor and the channel length L meets a function relationship $V_{th}$=f(L) when it is presumed that an interface state of a crystal inside the channel of the transistor is uniform. The above function relationship is derived through experiments in accordance with the threshold voltage $V_{th}'$ of the secondary driving transistor and the corresponding channel length, and then the channel length of the primary driving transistor is substituted into the functional relationship to acquire the threshold voltage $V_{th}$ of the primary driving transistor.

At the data scanning stage, a compensated data voltage $V_{data}$ is applied to the data sensing line 70, so as to compensate for the threshold voltage $V_{th}$ of the first transistor $T_1$ (the primary driving transistor), thereby to prevent the occurrence of the non-uniform display brightness due to a difference in the threshold voltage of the first transistor $T_1$. Here, the compensated data voltage $V_{data}$ is a sum of a data voltage $V_{pixel}$ before the compensation and a compensation voltage $f(V_{th})$, and the compensation voltage $f(V_{th})$ is determined in accordance with the threshold voltage $V_{th}$ of the primary driving transistor. For example, the compensation voltage $f(V_{th})$ is equal to the threshold voltage $V_{th}$ of the primary driving transistor. For another example, the compensation voltage $f(V_{th})$ is a sum or a difference of the threshold voltage $V_{th}$ of the primary driving transistor and another value, and the other value is an average of the threshold voltages $V_{th}$ of the first transistors $T_1$ (the primary driving transistors) in different pixels.

According to the embodiments of the present disclosure, the pixel circuitry includes the driving circuit 30, and the first switching circuit 20 and the second switching circuit 40 electrically connected between the data sensing line 70 and the driving circuit 30. The driving transistor of the driving circuit 30 is a TFT with two channels, the primary driving transistor with a large channel length is electrically connected to the light-emitting element 10, and the secondary driving transistor with a small channel length is electrically connected to the second switching circuit 20. The secondary driving transistor with the small channel length is used to charge the data sensing line 70 at the sensing scanning stage, and the primary driving transistor with the large channel length is used to drive the OLED to emit light normally at the data scanning stage. In this way, the driving transistor provides a large current to charge a distributed capacitor on the data sensing line at the data sensing stage, and the sensing voltage $V_{sens}$ is able to be in a saturated state within a short time period, i.e., the sensing voltage $V_{sens}$ reaches a voltage for cutting off the secondary driving transistor. Then, the threshold voltage $V_{th}'$ of the secondary driving transistor is acquired in accordance with the detected sensing voltage $V_{sens}$, and the threshold voltage $V_{th}$ of the primary driving transistor is calculated in accordance with $V_{th}'$ and the function relationship between the threshold voltage and the channel length. At the data scanning stage, the compensated data voltage is applied to the data sensing line 70 in accordance with the threshold voltage $V_{th}$ of the primary driving transistor to drive the light-emitting element to emit light. Through the two-channel design, it is able to increase a charging capability for the data sensing line 70 through the secondary driving transistor with the small channel length, so as to enable the voltage on the data sensing line 70 to reach the sensing voltage $V_{sens}$ for cutting off the driving transistor within a short time period, thereby to solve the problem in pixel compensation scheme of the related art where the acquired threshold voltage of the driving transistor is inaccurate when the data sensing line is charged insufficiently by the driving transistor, improve the detection accuracy of the threshold voltage of the driving transistor, and prevent the occurrence of non-uniform display brightness due to the difference in the threshold voltage of the driving transistor.

In some embodiments of the present disclosure, as shown in FIG. 1, the data sensing line 70 is electrically connected to a resetting circuit 50. The resetting circuit 50 is configured to reset a potential at the data sensing line 70 to an initialization voltage $V_{ini}$ in response to a resetting signal R, and the secondary driving transistor of the first transistor $T_1$ is turned on under control of the initialization voltage $V_{ini}$. It should be appreciated that, the initialization voltage $V_{ini}$ is smaller than the difference between the voltage of the first voltage end ELVDD and the threshold voltage $V_{th}'$ of the secondary driving transistor.

In the embodiments of the present disclosure, before the potential at the data sensing line 70 is maintained as the sensing voltage $V_{sens}$ for cutting off the secondary driving transistor of the first transistor $T_1$, the potential is reset to the initialization voltage $V_{ini}$ for turning on the secondary driving transistor. In this way, it is able to reduce the influence on the sensing voltage due to a fluctuation in the potential at the data sensing line 70 before it is maintained as the sensing voltage, and detect the sensing voltage more accurately, thereby to acquire a more accurate threshold voltage $V_{th}'$ of the secondary driving transistor of the first transistor $T_1$, and improve the accuracy of the threshold voltage of the first transistor $T_1$ (the primary driving transistor).

In some embodiments of the present disclosure, as shown in FIG. 1, a cathode of the light-emitting element 10 is electrically connected to a control circuit 60. The control circuit 60 is configured to enable the cathode of the light-emitting element 10 to be electrically connected to a second voltage end ELVSS or a third voltage end ELVDD' in response to at least one control signal. Here, the light-emitting element 10 is in a forward-biased mode under the control of a potential at the second voltage end ELVSS and in a backward-biased mode under the control of a potential at the third voltage end ELVDD'.

It should be appreciated that, in the case that the cathode of the light-emitting element 10 is connected to the second voltage end ELVSS, the light-emitting element 10 is in the forward-biased state, so the light-emitting element 10 is capable of emitting light when a condition has been met. In the case that the cathode of the light-emitting element 10 is connected to the third voltage end ELVDD', the light-emitting element 10 is in the backward-biased state, so it does not emit light.

FIG. 5 is a schematic view showing the pixel circuitry according to another embodiment of the present disclosure. As shown in FIG. 5, the second switching circuit 40 of the pixel circuitry includes a second transistor $T_2$ and a third transistor $T_3$. Control ends of the second transistor $T_2$ and the third transistor $T_3$ are configured to receive the second scanning signal S from the second scanning line, a first end of the second transistor $T_2$ is electrically connected to the first node A, a second end of the second transistor $T_2$ is electrically connected to the third end of the first transistor $T_1$, that is, electrically connected to the secondary transistor. A first end of the third transistor $T_3$ is electrically connected to the data sensing line 70, and a second end of the third transistor $T_3$ is electrically connected to the first node A.

The first switching circuit 20 includes a fourth transistor $T_4$, a control end of the fourth transistor $T_4$ is configured to receive the first scanning signal G from the first scanning line, a first end of the fourth transistor $T_4$ is electrically connected to the data sensing line 70, and a second end of the fourth transistor $T_4$ is electrically connected to the first node A.

The control circuit 60 includes a fifth transistor $T_5$ and a sixth transistor $T_6$. A control end of the fifth transistor $T_5$ is configured to receive a first control signal SEN, a first end of the fifth transistor $T_5$ is electrically connected to the cathode of the light-emitting element 10, and a second end of the fifth transistor $T_5$ is electrically connected to the third voltage end ELVDD'. A control end of the sixth transistor $T_6$ is configured to receive a second control signal EM, a first end of the sixth transistor $T_6$ is electrically connected to the cathode of the light-emitting element 10, and a second end of the sixth transistor $T_6$ is electrically connected to the second voltage end ELVSS.

In a first case, when the first control signal SEN is set as an on-state voltage of the fifth transistor $T_5$ and the second control signal EM is set as a cut-off voltage of the sixth transistor $T_6$, the fifth transistor $T_5$ is turned on and the sixth transistor $T_6$ is cut off. In this case, the cathode of the OLED is connected to the third voltage end ELVDD'. Usually, a constant high voltage is applied to the third voltage end ELVDD', so the light-emitting element OLED is in the backward-biased mode, and it does not emit light or in a non-display state. In the non-display state, a sensing operation is performed on the data sensing line 70, so as to sample the sensing single $V_{sens}$ carrying the threshold voltage $V_{th}'$ of the secondary driving transistor of the first transistor $T_1$.

In a second case, when the first control signal SEN is set as a cut-off voltage of the fifth transistor $T_5$ and the second control signal EM is set as an on-state voltage of the sixth transistor $T_6$, the fifth transistor $T_5$ is cut off and the sixth transistor $T_6$ is turned on. In this case, the cathode of the OLED is connected to the second voltage end ELVSS. Usually, a constant low voltage or a ground level is applied to the second voltage end ELVSS, so the OLED is in the forward-biased mode, and the driving current is allowed to flow through the OLED to drive the OLED to emit light.

The resetting circuit 70 includes a seventh transistor $T_7$. The seventh transistor $T_7$ includes a control end for receiving the resetting signal R, a first end electrically connected to the data sensing line 70 and a second end electrically connected to a fourth voltage end Vini.

In some embodiments of the present disclosure, the first transistor $T_1$ in the pixel circuitry in FIG. 5 is a dual-drain P-type TFT or a dual-source N-type TFT, and the other transistors are all N-type TFTs or P-type TFTs, or some of the transistors are N-type TFTs and the others are P-type TFTs.

FIG. 6 is a flow chart of a method for driving the pixel circuitry in FIG. 1. The method will be described hereinafter in conjunction with FIGS. 1 and 6.

As shown in FIG. 6, the method includes: Step 601 of, at a sensing scanning stage, maintaining a potential at the data sensing line to be a sensing voltage for cutting off the secondary driving transistor of the first transistor to acquire a threshold voltage of the secondary driving transistor, and calculating a threshold voltage of the primary driving transistor in accordance with the threshold voltage of the secondary driving transistor; and Step 602 of, at a data scanning stage, applying a compensated data voltage to the data sensing line to drive the light-emitting element to emit light, wherein the compensated data voltage is determined in accordance with the threshold voltage of the primary driving transistor.

Here, the sensing scanning stage belongs to a non-display period. To be specific, the sensing scanning stage is provided between a power-on time of the display panel and a start time point of a display period (i.e., a time point at which the display panel starts to display an image), or between an end time point of the display period (i.e., a time point at which the display of an image is ended by the display panel) and a power-off time of the display panel.

At the sensing scanning stage, the secondary driving transistor with a small channel length is used by the pixel circuitry to charge the data sensing line 70. After the potential at the data sensing line 70 is maintained as the sensing voltage $V_{sens}$ for cutting off the secondary driving transistor, the sensing voltage $V_{sens}$ is detected to acquire the threshold voltage $V_{th}'$ of the secondary driving transistor, and then the threshold voltage $V_{th}$ of the primary driving transistor is calculated in accordance with the threshold voltage $V_{th}'$ of the secondary driving transistor.

At the data scanning stage of the display period, the second switching circuit 40 is not turned on in response to the second scanning signal S, and the first switching circuit 20 is turned on in response to the first scanning signal G, so as to transfer the compensated data voltage from the data sensing line 70 to the second end of the capacitor $C_{st}$ and the control end of the first transistor $T_1$. The primary driving transistor of the first transistor $T_1$ is turned on under the control of the compensated data voltage, so as to generate a driving current for driving the light-emitting element 10 to emit light.

Here, the compensated data voltage is a sum of a data voltage $V_{pixel}$ before the compensation (also called as an original data voltage) and a compensation voltage $f(V_{th})$, and the compensation voltage $f(V_{th})$ is determined in accordance with the threshold voltage $V_{th}$ of the primary driving transistor of the first transistor $T_1$. It should be appreciated that, when the sensing scanning stage is between the power-on time of the display panel and the starting time point of the display period, the threshold voltage $V_{th}$ of the primary driving transistor is determined in accordance with the sensing voltage $V_{sens}$ within a current display period. When the sensing scanning stage is between the end time point of the display period and the power-off time of the display panel, the threshold voltage $V_{th}$ of the primary driving transistor is determined in accordance with the sensing voltage $V_{sens}$ within a previous display period of a current display period.

The method in the embodiments of the present disclosure is proposed with respect to the pixel circuitry including the driving transistor with two channels, and the method includes the sensing scanning stage and the data scanning stage. At the sensing scanning stage, the secondary driving transistor with a small channel length is used to charge the data sensing line, so as to maintain the potential at the data sensing line to be the sensing voltage for cutting off the secondary driving transistor, thereby to acquire the threshold voltage of the secondary driving transistor. Then, the threshold voltage of the primary driving transistor is calculated in accordance with the threshold voltage of the secondary driving transistor. At the data scanning stage, the compensated data voltage is applied to the data sensing line in accordance with the threshold voltage of the primary driving transistor, so as to drive the light-emitting element to emit light. Through this method, it is able to increase the current flowing through the driving transistor through the secondary driving transistor with the small channel length, and increase a charging capability of the driving transistor, so as to enable the voltage on the data sensing line to be in the saturated state within a short time period, i.e., to reach the sensing voltage for cutting of the driving transistor, thereby to detect the sensing voltage in a more accurate manner, improve the detection accuracy of the threshold voltage of the driving transistor, and prevent the occurrence of non-uniform display brightness due to the difference in the threshold voltage of the driving transistor.

In some embodiments of the present disclosure, the sensing scanning stage includes a threshold voltage establishment sub-stage. At the threshold voltage establishment sub-stage, the first switching circuit 20 is not turned on in response to the first scanning signal G, the second switching circuit is turned on in response to the second scanning signal S, the secondary driving transistor of the first transistor $T_1$ charges the storage capacitor $C_{st}$ and the data sensing line 70 to pull up a voltage on the data sensing line 70, and when the voltage on the data sensing line 70 has been pulled up to a difference between a voltage of the first voltage end ELVDD and the threshold voltage $V_{th}'$ of the secondary driving transistor, the secondary driving transistor is cut off. For example, at the end of the threshold voltage establish sub-stage, the sensing voltage $V_{sens}$ is in the saturated state, and it is equal to a difference between the voltage of the first voltage end ELVDD and the threshold voltage $V_{th}'$ of the secondary driving transistor.

In some other embodiments of the present disclosure, the sensing scanning stage further includes a resetting sub-stage before the threshold voltage establishment sub-stage. At the resetting sub-stage, the first switching circuit 20 is not turned on in response to the first scanning signal G, the second switching circuit 40 is turned on in response to the second scanning signal S to reset the potential at the data sensing line 70 to an initialization voltage $V_{int}$ for turning on the secondary driving transistor of the first transistor $T_1$. Here, the initialization voltage $V_{ini}$ may be smaller than the difference between the voltage of the first voltage end ELVDD and the threshold voltage $V_{th}'$ of the secondary driving transistor, so as to enable the secondary driving transistor of the first transistor $T_1$ to be in an on state. In this way, it is able to reduce the influence on the sensing voltage due to a fluctuation in the potential at the data sensing line 70 before it is maintained as the sensing voltage, and detect the sensing voltage more accurately, thereby to improve the accuracy of the threshold voltage $V_{th}$ of the first transistor $T_1$ (the primary driving transistor).

In some other embodiments of the present disclosure, the sensing scanning stage further includes a sampling sub-stage subsequent to the threshold voltage establishment sub-stage. At the sampling sub-stage, the sensing voltage $V_{sens}$ is read from the data sensing line 70 to acquire the threshold voltage $V_{th}'$ of the secondary driving transistor, the threshold voltage $V_{th}$ of the primary driving transistor is calculated in accordance with the threshold voltage $V_{th}'$ of the secondary driving transistor as well as a function relationship between the threshold voltage and a length of a channel, and the threshold voltage $V_{th}$ of the primary driving transistor is stored in a memory of an external compensation module.

In some embodiments of the present disclosure, at the data scanning stage, the second switching circuit 40 is not turned on in response to the second scanning signal S, the first switching circuit 20 is turned on in response to the first scanning signal G to transmit the compensated data voltage from the data sensing line 70 to the second end of the storage capacitor $C_{st}$ and the control end of the first transistor $T_1$, and the primary driving transistor of the first transistor $T_1$ is turned on under the control of the compensated data voltage to generate a driving current for driving the light-emitting element to emit light.

In some embodiments of the present disclosure, the data voltage is compensated in accordance with the threshold voltage $V_{th}$ of the primary driving transistor acquired previously. For example, the compensated data voltage $V_{data}$ is a sum of the original data voltage $V_{pixel}$ and compensation voltage $f(V_{th})$, so as to prevent the occurrence of non-uniform display brightness due to the difference in the threshold voltage of the first transistor $T_1$. Here, the compensation voltage $f(V_{th})$ is a value related to the threshold voltage $V_{th}$ of the primary driving transistor of the first transistor $T_1$.

An operation process of the pixel circuitry in FIG. 5 will be described hereinafter with reference to FIGS. 7 to 10. In the following description, the first transistor $T_1$ in the pixel circuitry in FIG. 5 is a dual-drain P-type TFT, and the other transistors are three-end P-type TFTs.

Figure 7:
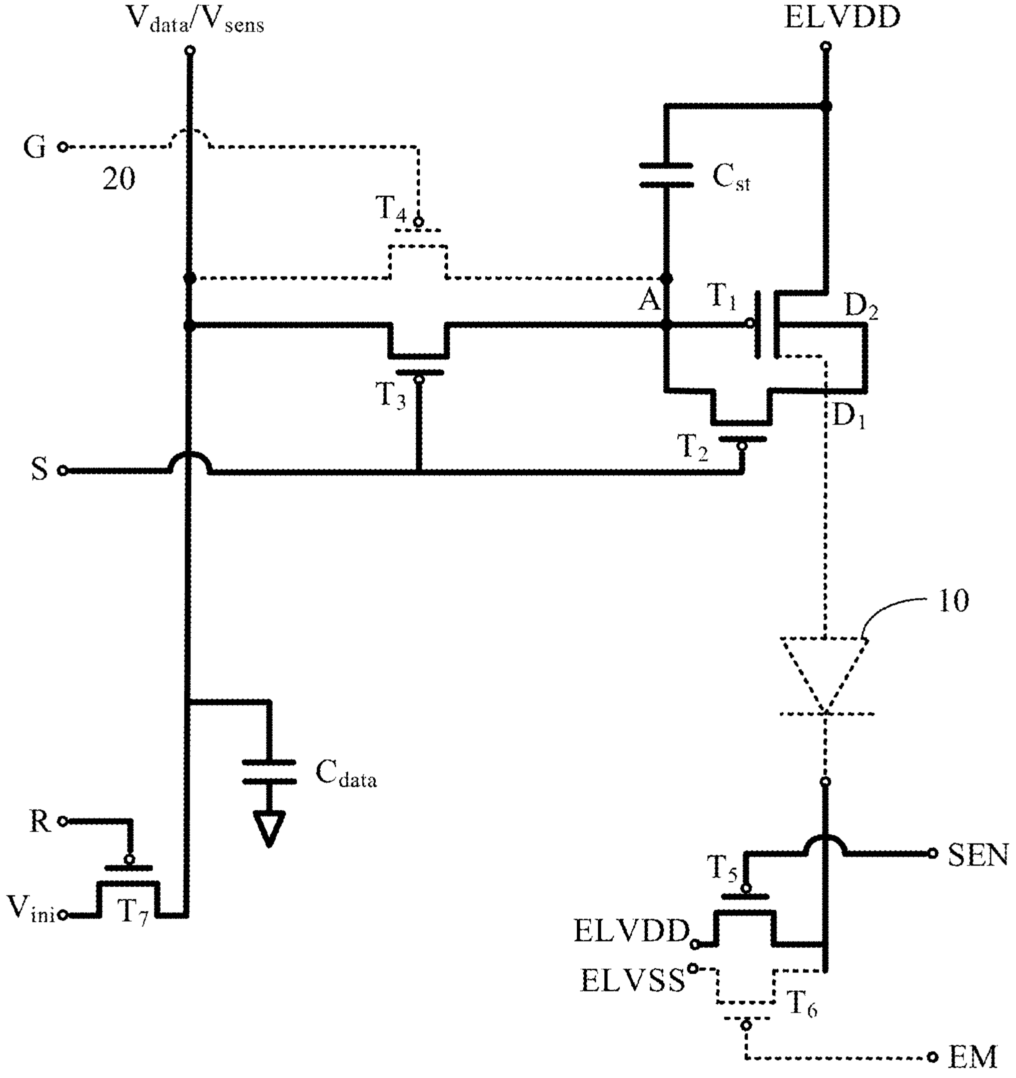
FIG. 7 is an equivalent circuit diagram of the pixel circuitry in FIG. 5 at a sensing scanning stage.

FIG. 7 is a sequence diagram of the pixel circuitry in FIG. 5 at the sensing scanning stage. The acquisition of the threshold voltage $V_{th}$ of the first transistor $T_1$ will be described hereinafter with reference to FIGS. 7 and 8.

Figure 8:
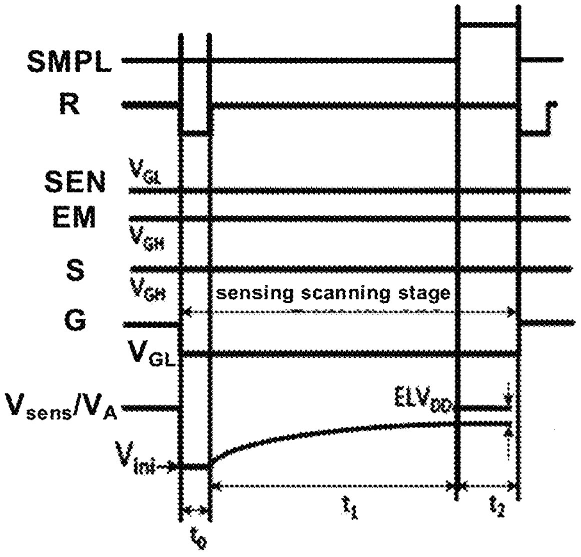
FIG. 8 is a sequence diagram of the pixel circuitry in FIG. 5 at a resetting sub-stage.

FIG. 8 is an equivalent circuit diagram of the pixel circuitry in FIG. 5 at the resetting sub-stage. As shown in FIGS. 7 and 8, at the resetting sub-stage to, the second scanning signal S, the resetting signal R and the first control signal SEN are each a low level $V_{GL}$, and the first scanning signal G and the second control signal EM are each a high level $V_{GH}$. Hence, the second transistor $T_2$, the third transistor $T_3$, the fifth transistor $T_5$ and the seventh transistor $T_7$ are turned on, and the fourth transistor $T_4$ and the sixth transistor $T_6$ are cut off.

The potential at the data sensing line 70 is reset to the initialization voltage $V_{ini}$ for turning on the secondary driving transistor of the first transistor $T_1$. In a possible embodiment of the present disclosure, the initialization voltage $V_{ini}$ is smaller than a difference between the voltage of the first voltage end ELVDD and the threshold voltage $V_{th}'$ of the secondary driving transistor. The second transistor $T_2$ and the third transistor $T_3$ are turned on under the control of the second scanning signal S, so as to allow the initialization voltage $V_{ini}$ to be written into the storage capacitor $C_{st}$ of the driving circuit 30 and the gate electrode of the driving transistor $T_1$. Because $V_{ini}$<the voltage $ELV_{DD}$ of the first voltage end ELVDD-$V_{th}$, the secondary driving transistor of the driving transistor $T_1$ is in the on state.

Next, at the threshold voltage establishment sub-stage $t_1$ of the sensing scanning stage, the resetting signal R is changed to be a high voltage $V_{GH}$, so as to turn off the seventh transistor $T_7$. The other signals are at a same level as those at the sub-stage to. The secondary driving transistor of the driving transistor $T_1$ and the second transistor $T_2$ form a diode to charge the storage capacitor $C_{st}$. In addition, the distributed capacitor Cdata on the data sensing line 70 is charged through the third transistor $T_3$. Due to a charging effect, levels at the data sensing line 70 and the storage capacitor $C_{st}$ increase from the initialization voltage $V_{ini}$. Along with an increase in the levels, a gate-to-source voltage $V_{gs}$ of the driving transistor $T_1$ decreases. Within a certain time period, when $V_{gs}$ decreases to the threshold voltage $V_{th}'$ of the secondary driving transistor of the driving transistor $T_1$, the secondary driving transistor is in an off state, and the voltages of the distributed capacitor on the data sensing line 70 and the storage capacitor $C_{st}$ reach the saturated state. At this time, for example, at the end of the threshold voltage establishment sub-stage $t_1$, the voltage on the data sensing line 70 is the sensing voltage $V_{sens}$, i.e., the difference between the voltage $ELV_{DD}$ of the first voltage end ELVDD and the threshold voltage $V_{th}'$ of the secondary driving transistor.

Next, at the sampling sub-stage $t_2$ of the sensing scanning stage, the potential at the data sensing line 70 is maintained to be the sensing voltage $V_{sens}$. A source driver is changed from a low level $V_{GL}$ to a high level $V_{GH}$ in response to a sample signal SMPL, so as to read the potential at the data sensing line 70, and the threshold voltage $V_{th}'$ of the secondary driving transistor is acquired through $V_{sens}=ELV_{DD}-V_{th}'$. Then, the threshold voltage $V_{th}$ of the primary driving transistor is calculated in accordance with the threshold voltage $V_{th}'$ of the secondary driving transistor as well as the function relationship between the threshold voltage and the channel length. In a possible embodiment of the present disclosure, the threshold voltage $V_{th}$ of the primary driving transistor is stored in a memory of an external compensation module.

Figure 9:
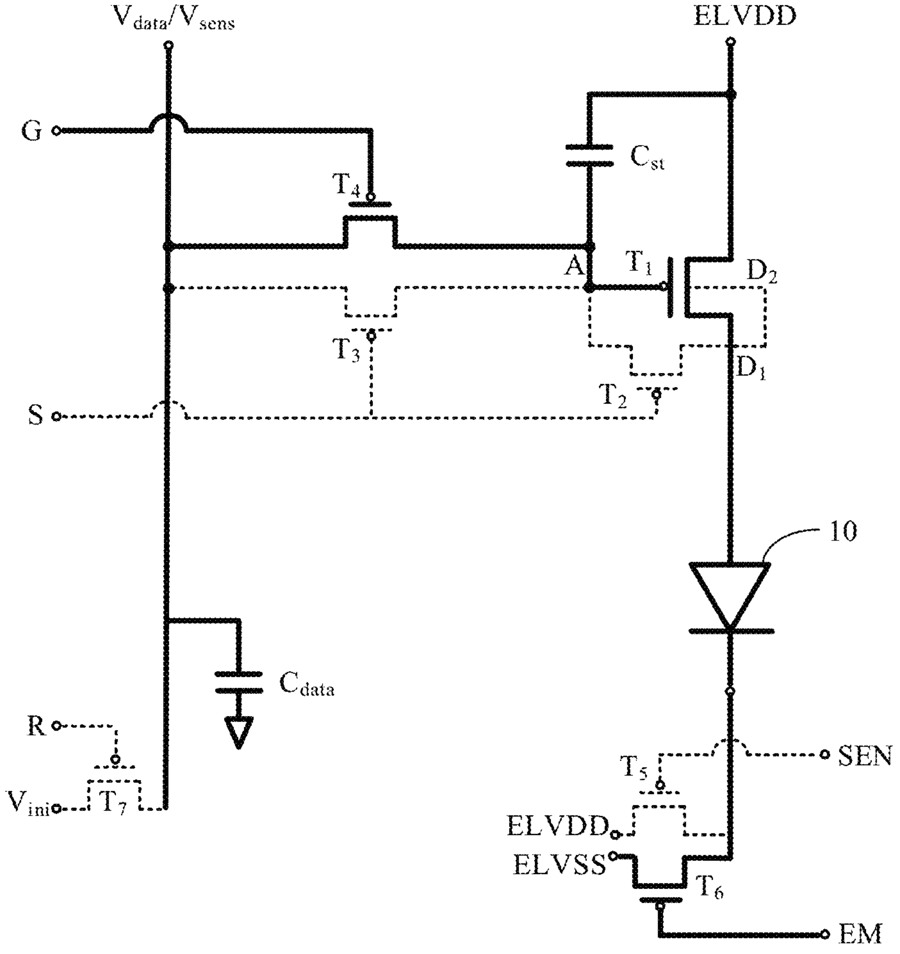
FIG. 9 is an equivalent circuit of the pixel circuitry in FIG. 5 at a data scanning stage.
Figure 10:
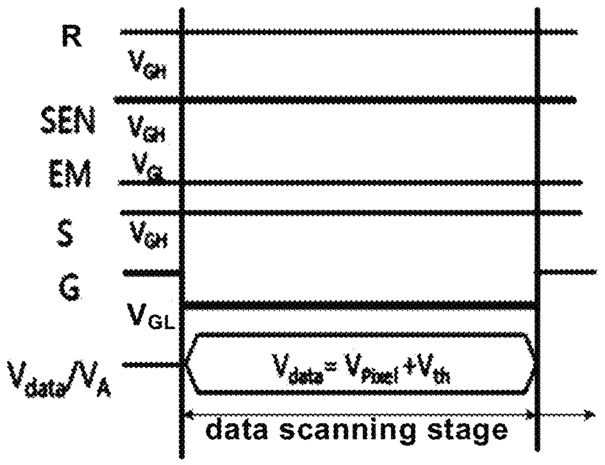
FIG. 10 is a sequence diagram of the pixel circuitry in FIG. 5 at the data scanning stage.

FIG. 9 is an equivalent circuit diagram of the pixel circuitry in FIG. 5 at the data scanning stage, and FIG. 10 is a sequence diagram of the pixel circuitry in FIG. 5 at the data scanning stage. A process of driving the pixel circuitry to display will be described hereinafter in conjunction with FIGS. 9 and 10.

As shown in FIGS. 9 and 10, at the data scanning stage, the second scanning signal S, the resetting signal R and the first control signal SEN are each a high level $V_{GH}$, so as to cut off the second transistor $T_2$, the third transistor $T_3$, the fifth transistor $T_5$ and the seventh transistor $T_7$. The first scanning signal G is a low level $V_{GL}$, so as to turn on the fourth transistor $T_4$. The second control signal EM is a low level $V_{GL}$, so as to turn on the sixth transistor $T_6$, thereby to allow the cathode of the OLED to be electrically connected to the second voltage end ELVSS typically configured to receive a constant low voltage or a ground level, and enable the OLED to be in the forward-biased mode. The second end $D_1$ of the first transistor $T_1$ is connected to the anode of the OLED, so a current is outputted by the second end $D_1$. The second transistor $T_2$ is turned off, and no current is outputted by the third end $D_2$ connected to the second transistor $T_2$, so the first transistor $T_1$ is configured to drive the OLED to emit light through the primary driving transistor with a large channel length.

To be specific, the data voltage $V_{data}$ across the data sensing line 70 is written into the control end of the first transistor $T_1$ and the second end of the capacitor $C_{st}$ through the fourth transistor $T_4$. The primary driving transistor of the first transistor $T_1$ is turned on under the control of the compensated data voltage $V_{data}$, so as to drive the light-emitting element 10 to emit light. In some embodiments of the present disclosure, a value of the data voltage is compensated in accordance with the acquired threshold voltage Vat of the primary driving transistor. For example, the compensated data voltage $V_{data}$ is a sum of the original data voltage $V_{pixel}$ and the compensation voltage $f(V_{th})$. Here, the compensation voltage $f(V_{th})$ is a voltage related to the threshold voltage $V_{th}$ of the primary driving transistor of the first transistor $T_1$.

As shown in FIGS. 9 and 10, the first scanning signal G is a low voltage $V_{GL}$ at the data scanning stage, so as to allow the compensated data voltage $V_{data}$ to be written into the node A through the fourth transistor $T_4$, i.e., $V_A=V_{data}$. The node A is also the gate electrode of the first transistor $T_1$ and one end of the storage capacitor $C_{st}$. The other end of the storage capacitor $C_{st}$ is electrically connected to the first voltage end ELVDD, and it is also the source electrode of the driving transistor $T_1$. Hence, the gate-to-source voltage of the driving transistor $T_1$ is $V_{gs}=V_{data}$−the voltage $ELV_{DD}$ of the first voltage end ELVDD.

When the first scanning signal G is a high voltage, the fourth transistor $T_4$ is turned off, and the voltage at the storage capacitor $C_{st}$ is maintained as $ELV_{DD}-V_{th}$. At this time, the primary driving transistor of the first transistor $T_1$ is maintained in the saturated state, and thus the driving current $I_D$ is represented $$I_D = \frac{1}{2}\mu C_{OX}\frac{W}{L_1}(V_{gs}-V_{th})^2 = \frac{1}{2}\mu C_{OX}\frac{W}{L_1}(V_{data}-ELV_{DD}-V_{th})^2,$$

where μ represents a carrier mobility constant, Cox represents a capacitance relative to an oxide layer of the first transistor $T_1$, and W and $L_1$ represent a width and a length of the primary driving transistor of the first transistor $T_1$.

In a possible embodiment of the present disclosure, the compensation voltage $f(V_{th})$ is the threshold voltage $V_{th}$ of the primary driving transistor of the first transistor $T_1$. Because the threshold voltage $V_{th}$ of the primary driving transistor of the first transistor $T_1$ has been sampled and stored in the memory, a data signal applied at the data scanning stage includes an original pixel voltage and the threshold voltage $V_{th}$, i.e., $V_{data}=V_{pixel}+V_{th}$. Hence, the driving current $I_D$ is expressed as $$I_D = \frac{1}{2}\mu C_{OX}\frac{W}{L_1}(V_{data}-ELV_{DD}-V_{th})^2 = \frac{1}{2}\mu C_{OX}\frac{W}{L_1}(V_{pixel}-EV_{DD})^2.$$

Based on the above equation, the threshold voltage $V_{th}$ of the first transistor $T_1$ has been compensated, so that the driving current $I_D$ is independent of a value of $V_{th}$. Hence, the driving currents $I_D$ of the first transistors $T_1$ in different pixel circuitries are the same, so it is able to prevent the occurrence of non-uniform display brightness due to the difference in the threshold voltage of the driving transistor.

Figure 11:
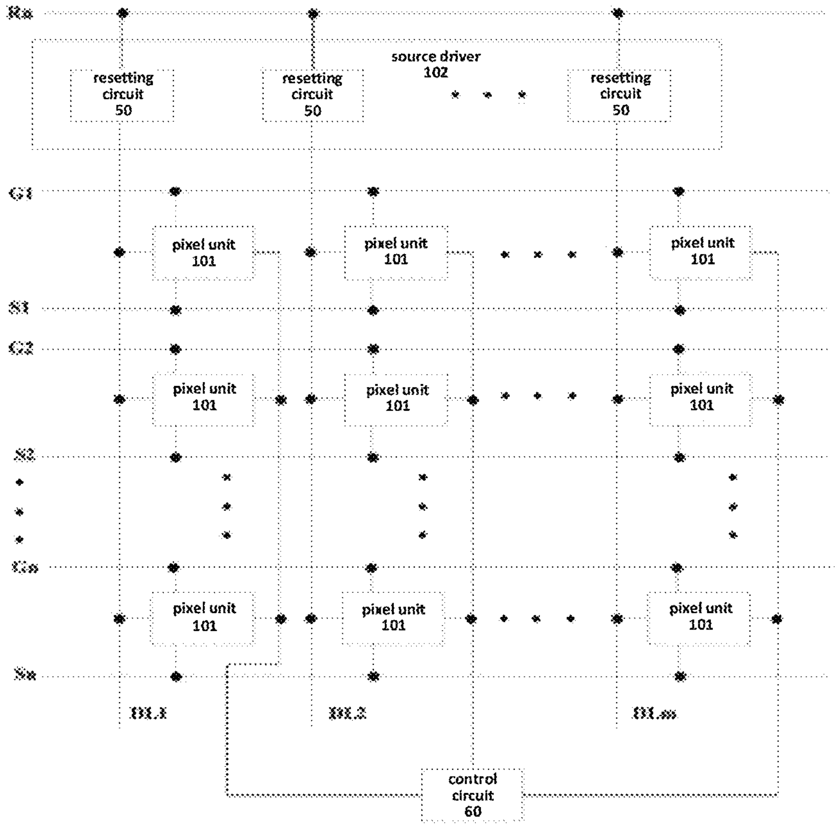
FIG. 11 is a schematic view showing a display device according to an embodiment of the present disclosure.

FIG. 11 is a schematic view showing a display device according to an embodiment of the present disclosure.

As shown in FIG. 11, the display device includes a plurality of pixel units 101 (in n rows and m columns). Each pixel unit 101 includes the above-mentioned pixel circuitry, e.g., the pixel circuitry in FIG. 1 or 5. In some embodiments of the present disclosure, the display device is any product or member having a display function, e.g., display panel, mobile terminal, television, display, laptop computer, digital photo frame, navigator or electronic paper.

In some embodiments of the present disclosure, as shown in FIG. 11, the display device further includes a plurality of first scanning lines, e.g., first scanning lines G1, G2, . . . , Gn. Each first scanning line is electrically connected to the pixel circuitries in the pixel units 101 in a same row. For example, the first scanning line G1 is electrically connected to the pixel circuitries in the pixel units 101 in a first row, the first scanning line G2 is electrically connected to the pixel circuitries in the pixel units 101 in a second row, and so on.

In some embodiments of the present disclosure, as shown in FIG. 11, the display device further includes a plurality of second scanning lines, e.g., second scanning lines S1, S2, .

. . . , Sn. Each second scanning line is electrically connected to the pixel circuitries in the pixel units 101 in a same row. For example, the second scanning line S1 is electrically connected to the pixel circuitries in the pixel units 101 in a first row, the second scanning line S2 is electrically connected to the pixel circuitries in the pixel units 101 in a second row, and so on.

In some embodiments of the present disclosure, as shown in FIG. 11, the display device further includes a plurality of data sensing lines electrically connected to a source driver 102, e.g., data sensing lines DL1, DL2, . . . , DLm. Each data sensing line DL is electrically connected to the pixel circuitries in the pixel units 101 in a same column. For example, the data sensing line DL1 is electrically connected to the pixel circuitries in the pixel units 101 in a first column, the data sensing line DL2 is electrically connected to the pixel circuitries in the pixel units 101 in a second column, and so on.

It should be appreciated that, the plurality of pixel units 101, the plurality of first scanning lines, the plurality of second scanning lines and the plurality of data sensing lines are arranged at a display region of the display device. In some embodiments of the present disclosure, the plurality of first scanning lines and the plurality of second scanning lines are electrically connected to a gate driver.

In some embodiments of the present disclosure, as shown in FIG. 11, the display device further includes a plurality of resetting circuitries 50 arranged at a non-display region of the display device or in the source driver 102 and electrically connected to a same resetting line Rn. Each resetting circuit 50 is electrically connected to a corresponding data sensing line, i.e., the resetting circuitries 50 correspond to the data sensing lines respectively. Each resetting circuit 50 is configured to reset a potential at the corresponding data sensing line to the initialization voltage $V_{ini}$ in response to a resetting signal R (e.g., at the resetting sub-stage to of the sensing scanning stage).

The secondary driving transistor of the first transistor $T_1$ in each pixel unit 101 electrically connected to the data sensing line is turned on under the control of the initialization voltage $V_{ini}$. For example, the resetting circuit 50 electrically connected to the data sensing line DL1 resets the potential at the data sensing line DL1 to the initialization voltage $V_{ini}$ for turning on the secondary driving transistor of the first transistor $T_1$ in each pixel unit 101 in the first column electrically connected to the data sensing line DL1, the resetting circuit electrically connected to the data sensing line DL2 resets the potential at the data sensing line DL2 to the initialization voltage $V_{ini}$ for turning on the secondary driving transistor of the first transistor $T_1$ in each pixel unit 101 in the second column electrically connected to the data sensing line DL2, and so on.

In some embodiments of the present disclosure, the structure of the resetting circuit 50 is shown in FIG. 5. Each resetting circuit 50 includes a seventh transistor $T_7$, a control end of which is configured to receive the resetting signal R, a first end of which is electrically connected to the corresponding data sensing line, and a second end of which is electrically connected to a fourth voltage end Vini.

In some embodiments of the present disclosure, the display device further includes a control circuit 60 arranged at the non-display region or in a power source, and electrically connected to the cathode of the light-emitting element 10 in each pixel unit 101. The control circuit 60 is configured to enable the cathode of the light-emitting element 10 in each pixel unit 101 to be electrically connected to the second voltage end ELVSS or the third voltage end ELVDD' in response to at least one control signal. For example, the control circuit 60 controls the cathode of the light-emitting element 10 in each pixel unit 101 to be electrically connected to the second voltage end ELVSS at the data scanning stage, and electrically connected to the third voltage end ELVDD' at the sensing scanning stage.

In some embodiments of the present disclosure, the structure of the control circuit 60 is shown in FIG. 5. At least one control signal includes the first control signal SEN and the second control signal EM. The control circuit includes a fifth transistor $T_5$ and a sixth transistor $T_6$. A control end of the fifth transistor $T_5$ is configured to receive the first control signal SEN, a first end thereof is electrically connected to the cathode of the light-emitting element 10 in each pixel unit 101, and a second end thereof is electrically connected to the third voltage end ELVDD'. A control end of the sixth transistor $T_6$ is configured to receive the second control signal EM, a first end thereof is electrically connected to the cathode of the light-emitting element 10 in each pixel unit 101, and a second end thereof is electrically connected to the second voltage end ELVSS.

In some embodiments of the present disclosure, the threshold voltages of the first transistors in the pixel units are detected progressively before or after a display stage of each display period. At the display stage of each display period, the light-emitting elements in the pixel units are driven in a row-by-row manner to emit light.

It should be appreciated that, although the operations of the method have been described in the drawings in a specific order, it does not require or imply that these operations must be performed in the specific order, or all the operations must be performed to achieve an expected result. In contrast, the steps in the drawings may be performed in any other order. Additionally or alternatively, some steps may be omitted, some steps may be combined as one step, and/or one step may be divided into a plurality of sub-steps.

The above description relates to only preferred embodiments of the present disclosure and an explanation of the applied technical principles. A person skilled in the art should understands that the scope of the invention involved in this disclosure is not limited to the technical solutions formed by the specific combination of the above technical features, and should also cover the other technical solutions formed by any combination of the above technical features or equivalent features thereof without departing from the inventive concept. For example, the above-mentioned features and the technical features similar to those disclosed in the present disclosure (but not limited thereto) may be replaced with each other to form a technical solution.

What is claimed is:

1. A pixel circuitry, comprising a driving circuit, a first switching circuit, a second switching circuit and a light-emitting element, wherein the driving circuit is configured to, under a control of a voltage transferred by the first switching circuit, drive the light-emitting element to emit light, and the driving circuit comprises a first transistor and a storage capacitor;

the first transistor is a four-end transistor comprising a first end, a second end, a third end and a control end; the control end of the first transistor is electrically connected to the first switching circuit, the first end of the first transistor is electrically connected to a first voltage end, the second end of the first transistor is electrically connected to an anode of the light-emitting element, and the third end of the first transistor is electrically connected to the second switching circuit;

a first end of the storage capacitor is electrically connected to the first voltage end, and a second end of the storage capacitor is electrically connected to the control end of the first transistor;

the first switching circuit is electrically connected to a data sensing line, and configured to write a voltage on the data sensing line into the storage capacitor in an on state in response to a first scanning signal from a first scanning line;

the second switching circuit is electrically connected to the data sensing line, and configured to enable the third end of the first transistor to be electrically connected to the data sensing line in the on state in response to a second scanning signal from a second scanning line;

wherein the pixel circuitry further comprises a resetting circuit, the data sensing line is electrically connected to the resetting circuit, the resetting circuit is configured to reset a potential at the data sensing line to an initialization voltage in response to a resetting signal, and a secondary driving transistor is configured to be turned on under a control of the initialization voltage.

2. The pixel circuitry according to claim 1, wherein the control end, the first end and the second end of the first transistor form a primary driving transistor, the control end, the first end and the third end of the first transistor form a secondary driving transistor, and a channel corresponding to the secondary driving transistor is a part of a channel corresponding to the primary driving transistor.

3. The pixel circuitry according to claim 2, wherein the first transistor is a dual-drain P-type Thin Film Transistor (TFT), the control end of the first transistor is a gate electrode, the first end of the first transistor is a source electrode, and the second end and the third end of the first transistor are a first drain electrode and a second drain electrode respectively.

4. The pixel circuitry according to claim 2, wherein the first transistor is a dual-source N-type TFT, the control end of the first transistor is a gate electrode, the first end of the first transistor is a drain electrode, and the second end and the third end of the first transistor are a first source electrode and a second source electrode respectively.

5. The pixel circuitry according to claim 2, wherein a ratio of a length of the channel corresponding to the primary driving transistor to a length of the channel corresponding to the secondary driving transistor is within a range of 2:1 to 30:1.

6. The pixel circuitry according to claim 1, wherein the control end of the first transistor is electrically connected to the first switching circuit via a first node, the second switching circuit comprises a second transistor and a third transistor, control ends of the second transistor and the third transistor are configured to receive the second scanning signal, a first end of the second transistor is electrically connected to the first node, a second end of the second transistor is electrically connected to the third end of the first transistor, a first end of the third transistor is electrically connected to the data sensing line, and a second end of the third transistor is electrically connected to the first node.

7. The pixel circuitry according to claim 1, wherein the first switching circuit comprises a fourth transistor, a control end of the fourth transistor is configured to receive the first scanning signal, a first end of the fourth transistor is electrically connected to the data sensing line, and a second end of the fourth transistor is electrically connected to the control end of the first transistor.

8. The pixel circuitry according to claim 1, wherein a cathode of the light-emitting element is electrically connected to a control circuit, the control circuit is configured to enable the cathode of the light-emitting element to be electrically connected to a second voltage end or a third voltage end in response to at least one control signal, wherein the light-emitting element is configured to be in a forward-biased mode under a control of a potential at the second voltage end, and the light-emitting element is configured to be in a backward-biased mode under a control of a potential at the third voltage end.

9. The pixel circuitry according to claim 8, wherein the light-emitting element is configured to emit light in the forward-biased mode, and the light-emitting element is configured to do not emit light in the backward-biased mode.

10. A display device, comprising a plurality of pixel units, wherein each of the pixel units comprises the pixel circuitry according to claim 1.

11. A method for driving a pixel circuitry, wherein the pixel circuitry comprises a driving circuit, a first switching circuit, a second switching circuit and a light-emitting element, wherein the driving circuit is configured to, under the control of a voltage transferred by the first switching circuit, drive the light-emitting element to emit light, and the driving circuit comprises a first transistor and a storage capacitor;

the first transistor is a four-end transistor comprising a first end, a second end, a third end and a control end; the control end of the first transistor is electrically connected to the first switching circuit, the first end of the first transistor is electrically connected to a first voltage end, the second end of the first transistor is electrically connected to an anode of the light-emitting element, and the third end of the first transistor is electrically connected to the second switching circuit;

a first end of the storage capacitor is electrically connected to the first voltage end, and a second end of the storage capacitor is electrically connected to the control end of the first transistor;

the first switching circuit is electrically connected to a data sensing line, and configured to write a voltage on the data sensing line into the storage capacitor in an on state in response to a first scanning signal from a first scanning line;

the second switching circuit is electrically connected to the data sensing line, and configured to enable the third end of the first transistor to be electrically connected to the data sensing line in the on state in response to a second scanning signal from a second scanning line;

the control end, the first end and the second end of the first transistor form a primary driving transistor, the control end, the first end and the third end of the first transistor form a secondary driving transistor, wherein the method comprises:

at a sensing scanning stage, maintaining a potential at the data sensing line to be a sensing voltage for cutting off the secondary driving transistor, to acquire a threshold voltage of the secondary driving transistor, and calculating a threshold voltage of the primary driving transistor in accordance with the threshold voltage of the secondary driving transistor;

at a data scanning stage, applying a compensated data voltage to the data sensing line to drive the light-emitting element to emit light, wherein the compensated data voltage is determined in accordance with the threshold voltage of the primary driving transistor;

wherein the pixel circuitry further comprises a resetting circuit, the data sensing line is electrically connected to the resetting circuit, the resetting circuit is configured to reset a potential at the data sensing line to an initialization voltage in response to a resetting signal, and a secondary driving transistor is configured to be turned on under a control of the initialization voltage.

12. The method according to claim 11, wherein the sensing scanning stage comprises a threshold voltage establishment sub-stage, wherein at the threshold voltage establishment sub-stage, the first switching circuit is not turned on in response to the first scanning signal, the second switching circuit is turned on in response to the second scanning signal, the secondary driving transistor charges the storage capacitor and the data sensing line to pull up a voltage on the data sensing line, and when the voltage on the data sensing line has been pulled up to a difference between a voltage of the first voltage end and the threshold voltage of the secondary driving transistor, the secondary driving transistor is cut off.

13. The method according to claim 12, wherein the sensing scanning stage further comprises a resetting sub-stage before the threshold voltage establishment sub-stage, wherein at the resetting sub-stage, the first switching circuit is not turned on in response to the first scanning signal, the second switching circuit is turned on in response to the second scanning signal, to reset the potential at the data sensing line to an initialization voltage for turning on the secondary driving transistor, and the initialization voltage is smaller than the difference between the voltage of the first voltage end and the threshold voltage of the secondary driving transistor.

14. The method according to claim 12, wherein the sensing scanning stage further comprises a sampling sub-stage subsequent to the threshold voltage establishment sub-stage, wherein at the sampling sub-stage, the sensing voltage is read from the data sensing line to acquire the threshold voltage of the secondary driving transistor, the threshold voltage of the primary driving transistor is calculated in accordance with the threshold voltage of the secondary driving transistor as well as a function relationship between the threshold voltage and a length of a channel, and the threshold voltage of the primary driving transistor is stored in a memory of an external compensation module.

15. The method according to claim 11, wherein at the data scanning stage, the second switching circuit is not turned on in response to the second scanning signal, the first switching circuit is turned on in response to the first scanning signal, to transmit the compensated data voltage from the data sensing line to the second end of the storage capacitor and the control end of the first transistor, the primary driving transistor is turned on under the control of the compensated data voltage to generate a driving current for driving the light-emitting element to emit light, the compensated data voltage is a sum of an original data voltage and a compensation voltage, and the compensation voltage is determined in accordance with the threshold voltage of the primary driving transistor.

16. The display device according to claim 10, wherein the control end, the first end and the second end of the first transistor form a primary driving transistor, the control end, the first end and the third end of the first transistor form a secondary driving transistor, and a channel corresponding to the secondary driving transistor is a part of a channel corresponding to the primary driving transistor.

17. The display device according to claim 16, wherein the first transistor is a dual-drain P-type TFT, the control end of the first transistor is a gate electrode, the first end of the first transistor is a source electrode, and the second end and the third end of the first transistor are a first drain electrode and a second drain electrode respectively.

18. The display device according to claim 16, wherein the first transistor is a dual-source N-type TFT, the control end of the first transistor is a gate electrode, the first end of the first transistor is a drain electrode, and the second end and the third end of the first transistor are a first source electrode and a second source electrode respectively.

19. The display device according to claim 16, wherein a ratio of a length of the channel corresponding to the primary driving transistor to a length of the channel corresponding to the secondary driving transistor is within a range of 2:1 to 30:1.

* * * * *